United States Patent [19]

Yoshida et al.

[11] Patent Number: 4,510,537

[45] Date of Patent: Apr. 9, 1985

[54] MAGNETIC HEAD MOVING VELOCITY DETECTOR

[75] Inventors: Shigemasa Yoshida; Ichiro Araki, both of Kanagawa, Japan

[73] Assignee: Computer Basic Technology Research Assoc., Japan

[21] Appl. No.: 491,185

[22] Filed: May 3, 1983

[30] Foreign Application Priority Data

May 4, 1982 [JP] Japan .................................. 57-74721
Sep. 28, 1982 [JP] Japan ................................ 57-168733

[51] Int. Cl.³ .............................................. G11B 5/55
[52] U.S. Cl. ...................................................... 360/78
[58] Field of Search .............. 318/616, 617, 618, 636; 324/160, 163, 177; 360/78

[56] References Cited

U.S. PATENT DOCUMENTS 3,691,543 9/1972 Mueller .................................. 360/77
3,820,712 6/1974 Oswald ........................... 235/151.32

OTHER PUBLICATIONS

IEEE Transactions on Magnetics, vol. MAG-11, No. 5, Sep. 1975, pp. 1245-1246, An Electronic Tachometer for Disk File Motion Control, R. Oswald.

Primary Examiner—George G. Stellar
Attorney, Agent, or Firm—Bernard, Rothwell & Brown

[57] ABSTRACT

A detector for the moving velocity of a magnetic head of a magnetic disc memory device by electrically processing a position signal of the magnetic head, which includes a circuit for differentiating the position signal, means for rectifying the differentiating circuit, a circuit for sampling-hold of the rectified signal, a phase-shifter for delaying the position signal and means for generating a timing pulse signal to determine the timing for sampling, with the phase delaying characteristic of the transfer function of the differentiating circuit and the phase-shifting circuit being substantially coincided.

16 Claims, 20 Drawing Figures

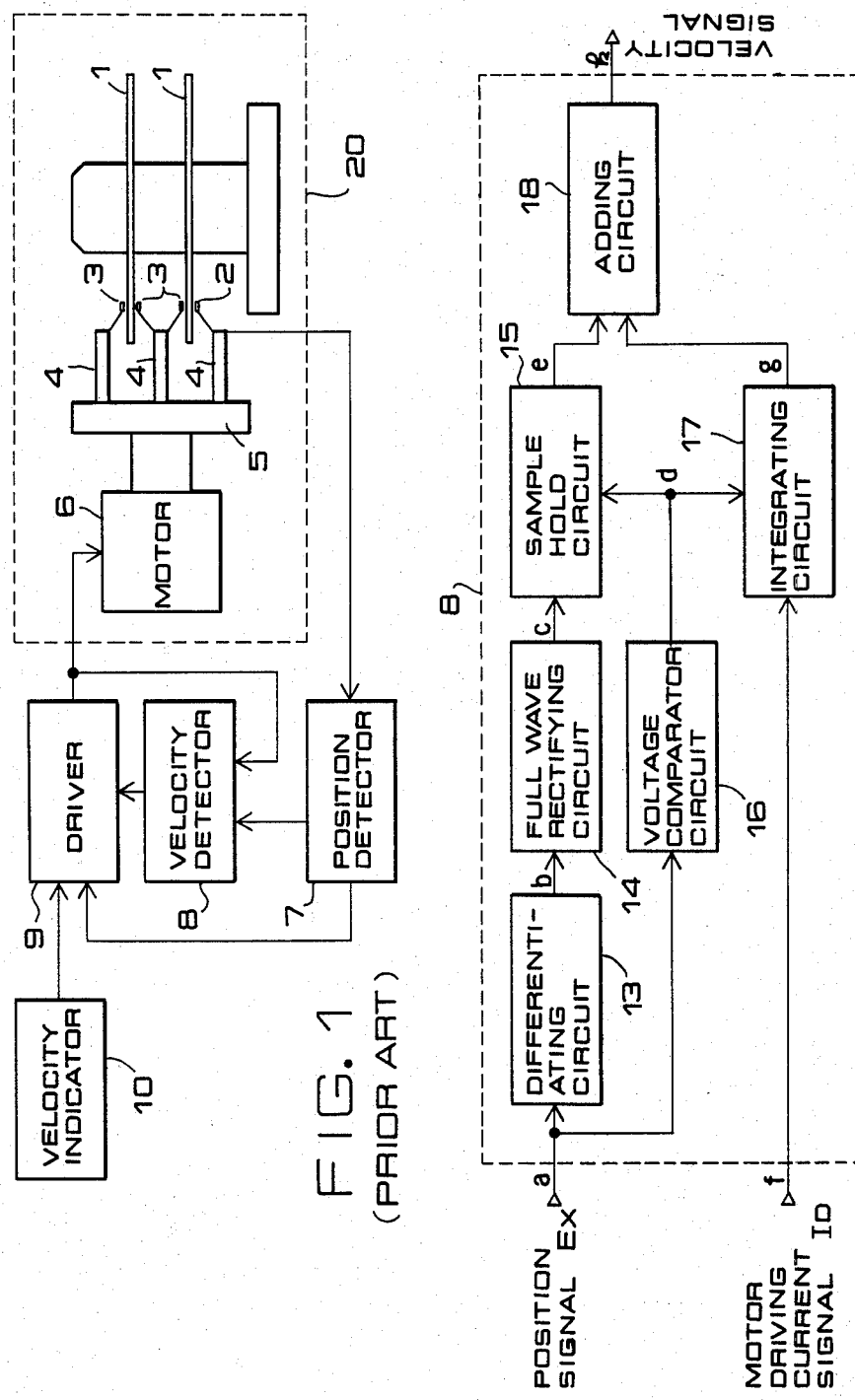

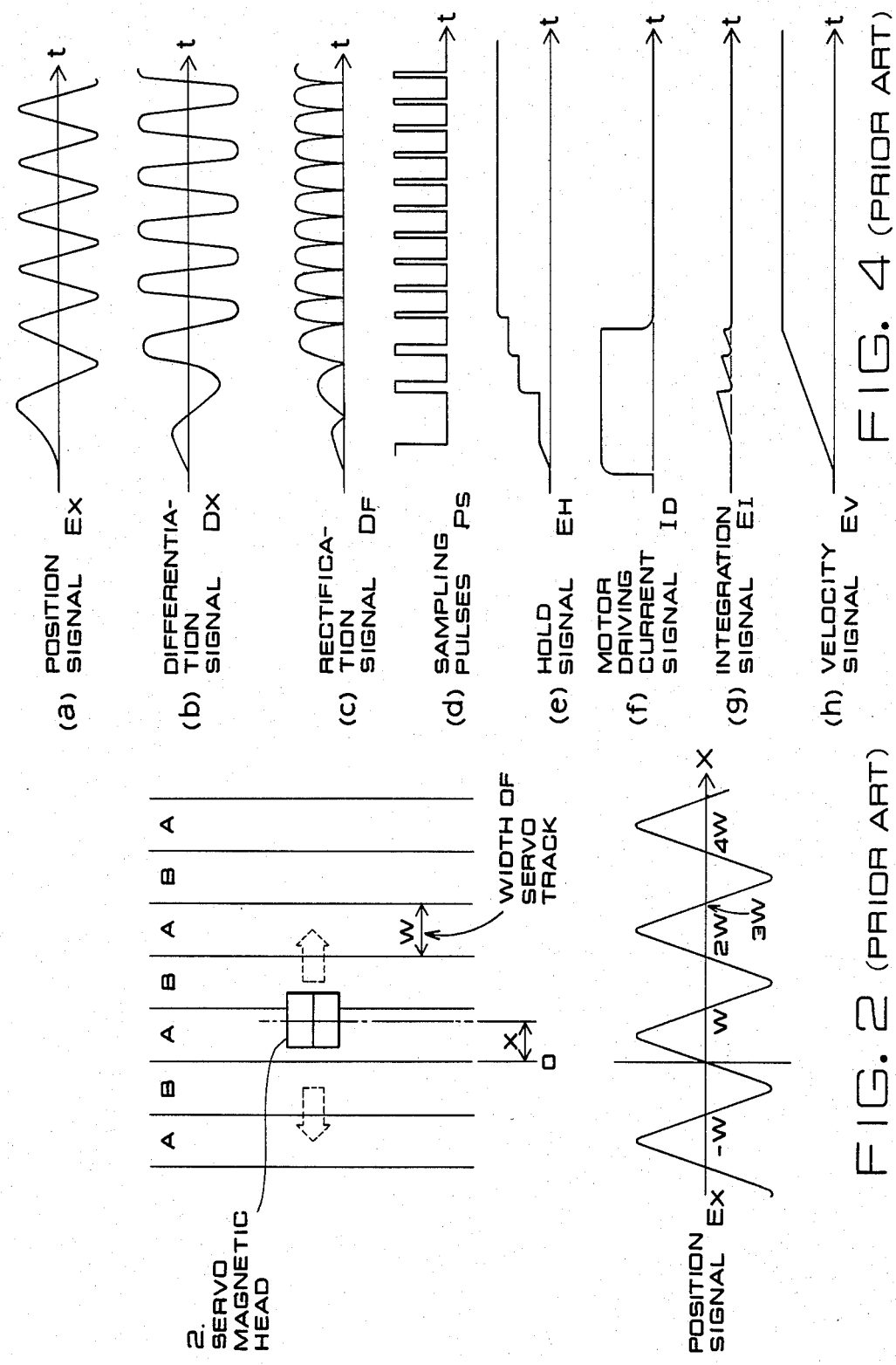

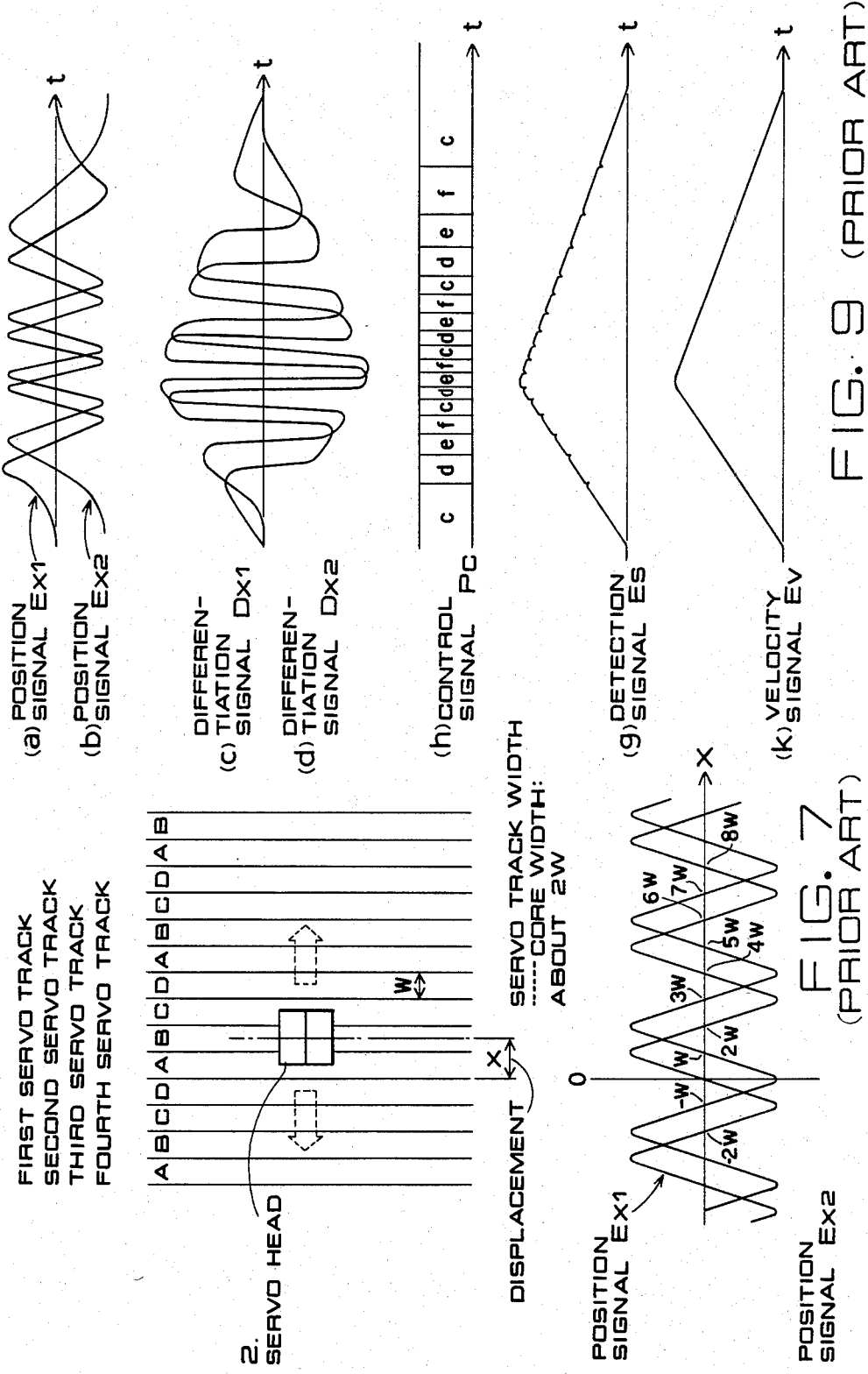

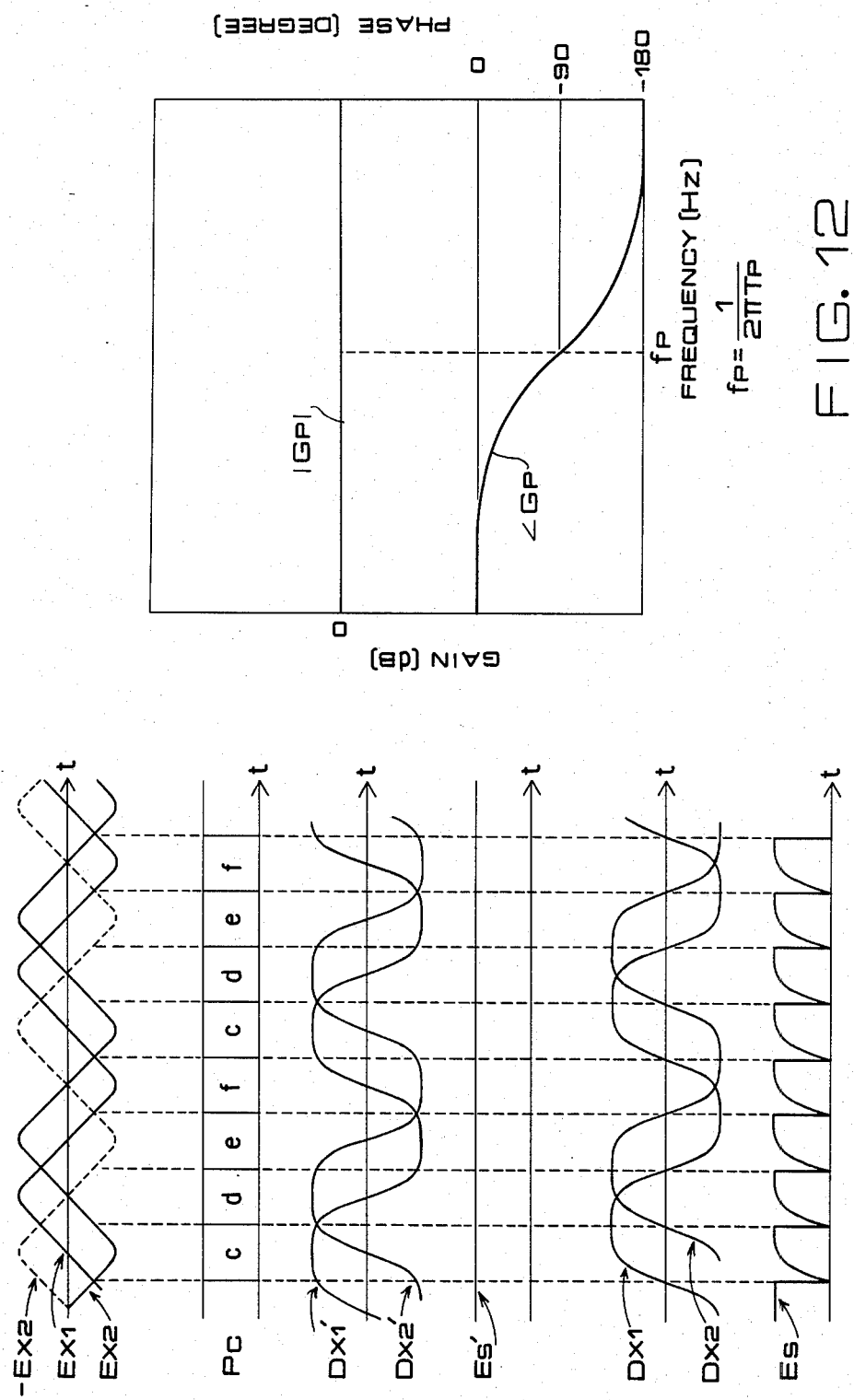

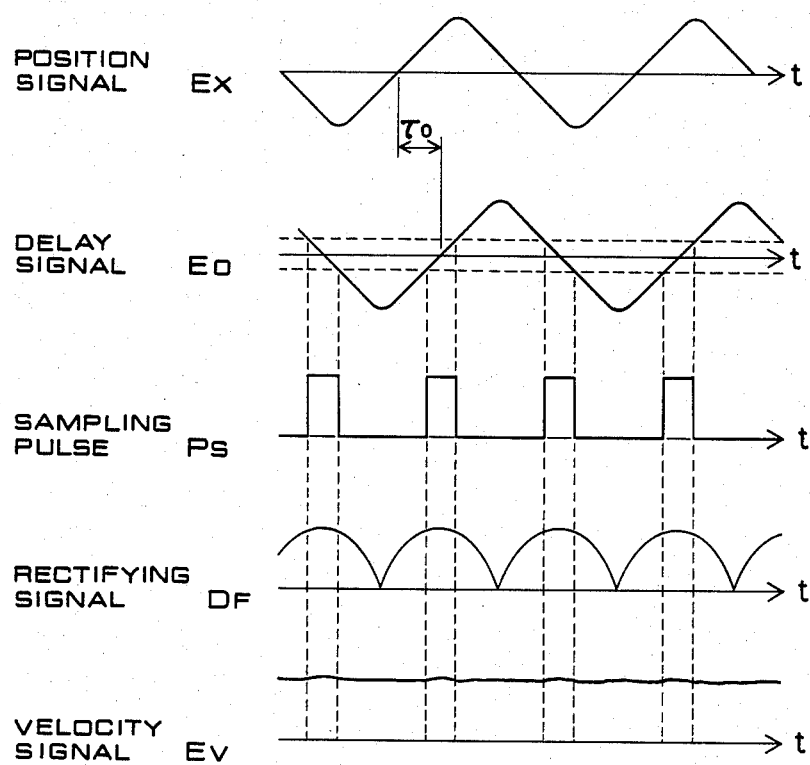
FIG. 13
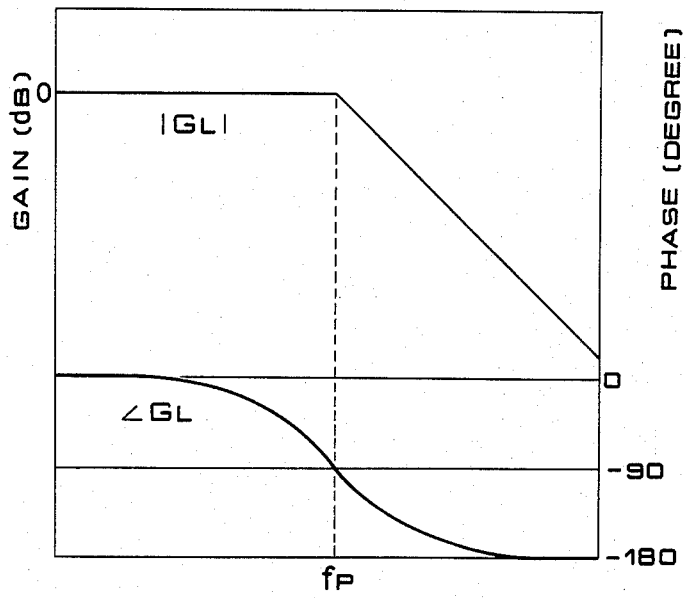
FIG. 14  $f_P = \frac{1}{2\pi T_P}$

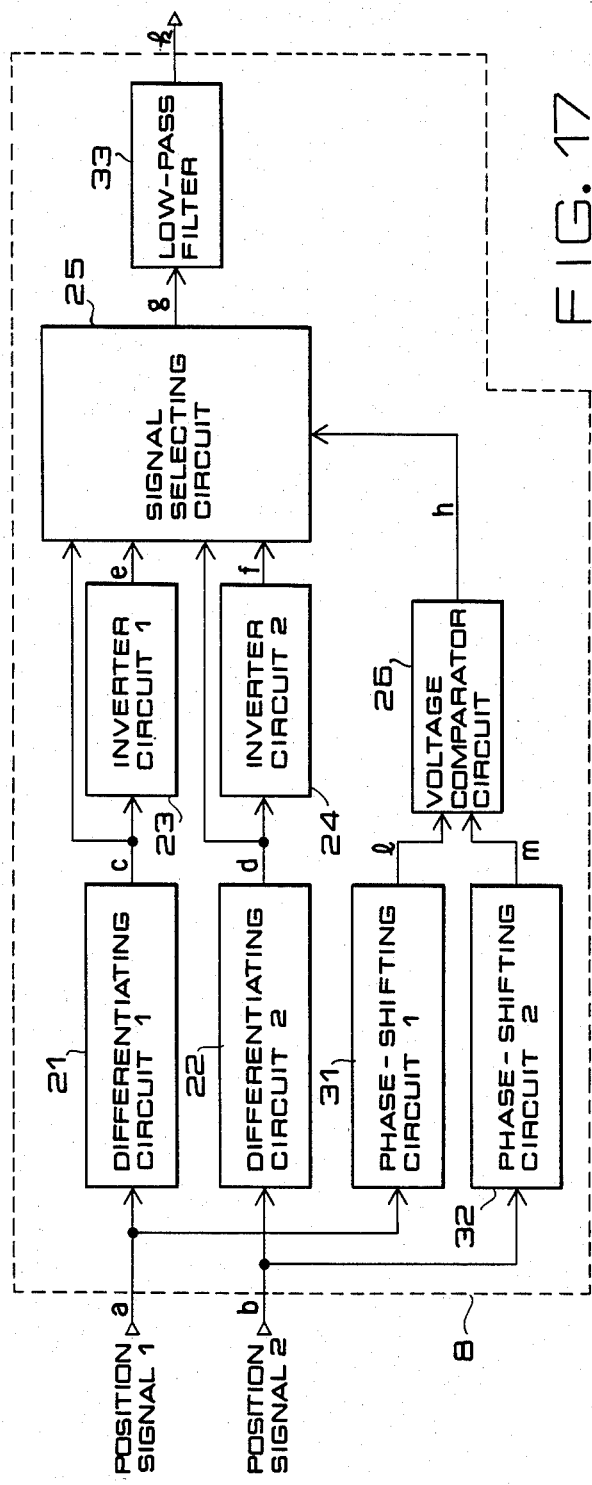
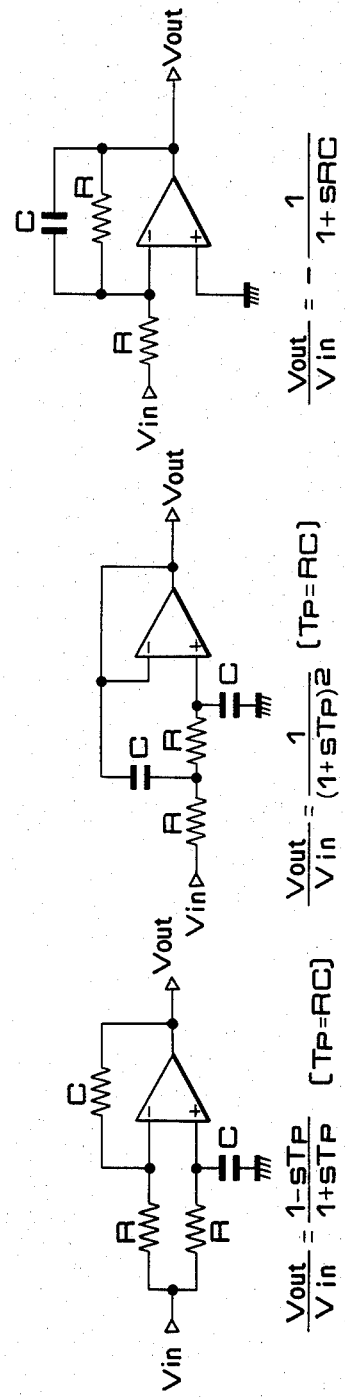
FIG. 17
FIG. 18 (a)  $\dfrac{Vout}{Vin} = \dfrac{1-sT_P}{1+sT_P}$  [$T_P = RC$]
FIG. 18 (b)  $\dfrac{Vout}{Vin} = \dfrac{1}{(1+sT_P)^2}$  [$T_P = RC$]
FIG. 19  $\dfrac{Vout}{Vin} = -\dfrac{1}{1+sRC}$

MAGNETIC HEAD MOVING VELOCITY DETECTOR

BACKGROUND OF THE INVENTION

1. Field of the Invention

This invention relates to a magnetic head moving velocity detector for magnetic disc unit.

2. Description of the Prior Art

In a magnetic disc unit, there are formed a multiple of data tracks on an information recording face of a magnetic disc, and when information is to be written on or read from a magnetic disc, it is necessary to accurately and rapidly position a magnetic head to a desired data track. As a magnetic head drive system therefor, there is a so-called track servo system wherein one of a plurality of information recording faces is used as a servo face.

Details of such a technique regarding a magnetic head controlling device of this type are known by following documents:

1. IEEE Transaction on Magnetics, Vol. Mag-11, No. 5, September 1975, "AN ELECTRONIC TACHOMETER FOR DISC FILE MOTION CONTROL", R. K. Oswald, P1245-P1246,
2. R. K. Oswald, "Design of a disk file head-positioning servo, "IBM T. Res. & Dev., vol. 18, no. 6, November 1974,
3. F. E. MUELLER, "Positioning system including servo track configuration and associated demodulator," U.S. Pat. No. 3,691,543, Sept. 1972, and
4. R. K. Oswald, "Electronic tachometer, "U.S. Pat. No. 3,820,712, June 1974.

In the followings, description will be first given of essential part of this technique.

FIG. 1 is a block diagram showing the construction of a track servo system, and reference numeral 1 designates a magnetic disk which has magnetic films as record media on opposite faces thereof. The system as shown in FIG. 1 includes two magnetic disks 1 and hence has up to four record faces, of which the bottom face of the lower magnetic disk is utilized as a servo face while the remaining record faces are used as data faces. Reference numerals 2 and 3 designate magnetic heads, of which the former 2 is a servo head while the latter 3 is a data head. Reference numeral 4 designates a head holder, 5 a head holding structure, 6 a driving device in the form of a linear motor, 7 a position detector, 8 a velocity detector, 9 a driver, 10 a velocity indicator, and 20 generally designates a magnetic disk head assembly. The motor 6 drives the head holding structure 5 to move in a radial direction of the magnetic disks 1. Each head holder 4 is secured to the head holding structure 5 while the servo head 2 and the data heads 3 are secured to the respective head holders 4 so that the servo head 2 and the data heads 3 are moved together. Accordingly, if the servo head 2 is positioned correctly, then the data heads 3 will also be positioned correctly.

A signal reproduced from the servo head 2 is converted into a position signal representative of a present position of the servo head 2 by the position detector 7. The position signal and an electric current signal obtained from the driver 9 are both coupled to the velocity detector 8 which thus converts and mixes both signals into a velocity signal. The position signal and the velocity signal are both inputted to the driver 9 to obtain a control signal for driving the motor 6. A target signal is also inputted into the driver 9 from the velocity indicator 10. The target signal is indicative of a target value of velocity at which the magnetic heads are to be driven to move.

FIG. 2 is an illustrative view showing an arrangement of servo tracks on a servo face and a waveform of a position signal after processing of a signal obtained from these servo tracks, and reference numeral 2 designates a servo head which is similar to that shown in FIG. 1. On the servo face, there are precedingly recorded first servo tracks A and second servo tracks B in alternate adjacent relationship. The servo head 2 is movable in a direction transverse to these servo tracks. If the displacement of the servo head 2 in the direction transverse to the servo tracks is represented by x, the position signal obtained when the servo head 2 is moved in the direction x assumes a waveform as shown by Ex. Reference symbol W indicates the width of a servo track, and the core of the servo head is designed to also have width substantially equal to W.

FIG. 3 is a block diagram of a conventional velocity detector, and FIG. 4 is an illustrative view showing waveforms at several portions of the velocity detector 3 as shown in FIG. 3. The position signal is coupled to an input terminal (a) of the velocity detector 3. FIG. 4 shows waveforms at several portions of the velocity detector 3 until a predetermined fixed velocity is reached after the head has started its movement from its stopped position, and (a) of FIG. 4 illustrates a waveform of the position signal Ex. Since the velocity of movement of the head is given as a time differentiated value of the position of the head, a velocity signal can be obtained by time differentiation of the position signal Ex. Based on this principle, the velocity detector 8 includes at its first stage a differentiating circuit 13 which differentiates the position signal Ex to produce a differentiation signal Dx at a point (b) thereof. If perfect linearity is maintained between the head position and the corresponding position signal, then the differentiation signal Dx can be considered the velocity signal. But actually, it is only when the absolute value of the position signal Ex is within a limited range below a particular fixed value that linearity is maintained between the head position and the position signal. Accordingly, a range in which velocity can be detected by differentiation will also be discrete, and thus velocity is really detected by processing of the waveform as described in the followings. In particular, since the differentiation waveform Dx as shown by (b) of FIG. 4 indicates the correct velocity around its peak points, the velocity can be detected by sampling and interconnecting these portions of the waveform Dx. A full-wave rectifying circuit 14 is provided to arrange positive and negative peaks of the differentiation signal Dx to a single direction. A rectification signal $D_F$ thus appears at an output point (c) of the full-wave rectifying circuit 14 and is coupled to a sample hold circuit 15. Sampling pulses Ps are received by the sample hold circuit 15 at another input point (d) thereof. A sampling pulse Ps is produced when the position signal Ex is compared at a voltage comparator circuit 16 which serves as a sampling pulse generating circuit and the absolute value of a result of the comparison is below a predetermined fixed level. The sample hold circuit 15 takes in the rectification signal $D_F$ only when the sampling pulse is of a high potential (H level), and holds the preceding value when the sampling pulse Ps is of a low potential (L level) to provide a hold signal $E_H$ at an output point (e) thereof.

If the velocity of movement of the head does not vary, detection of velocity can be correctly effected with the hold signal $E_H$, but when the velocity is varying, the hold signal $E_H$ presents a stair step waveform as shown by (e) of FIG. 4. Since velocity detection by differentiation of position is impossible at this part, another method is employed in which velocity is detected by integration of acceleration. Coupled to another input terminal (f) of the velocity detector 8 is a current signal $I_D$ which is in proportion to a driving current of the motor 6. There is a proportional relationship between the driving current and a driving force generated thereby, and the driving force is also in proportional relationship to the acceleration. Accordingly, the current signal $I_D$ can also be considered an acceleration signal when the head is moved, and hence detection of the velocity is possible by integrating the current signal $I_D$. The integrating circuit 17 integrates the current signal $I_D$ only while the sampling pulses Ps are of a low potential. When the sampling pulses Ps are of a high potential, velocity detection can be effected by differentiation of the position and accordingly, there is no necessity of integration operation and thus the integrating circuit is brought to a reset condition. A discrete integration signal $E_I$ thus appears at an output point (g) of the integrating circuit 17. An an adding circuit 18 at the final stage, the hold signal $E_H$ and the integration signal $E_I$ are added to each other to produce a velocity signal Ev at an output terminal (h) thereof.

According to the velocity detector 8 as described hereinabove in reference to FIG. 3, characteristics of the differentiating circuit 13 have significant influence on the performance of the entire system. Conventional differentiating circuits commonly employ a combination of an operational amplifier with a resistor and a capacitor, and a transfer function $G_D$ is represented by a following equation:

$$G_D = \frac{sT0}{(1 + sT1)(1 + sT2)} \quad [T1 > T2]$$

where $s = j(2\pi f)$ (f: frequency, j: imaginary unit), and T0, T1 and Ts are constants decided in accordance with the circuit constant. FIG. 5 illustrates frequency characteristics of amplitude and phase of $G_D$. In FIG. 5, f1 shows a differentiation upper limited frequency, and f2 indicates an integration frequency. Normally, f1 is around several tens KHz, and a possible maximum frequency of the position signal Ex when the head is moved is a fraction of this frequency. In a trend of increasing the speed of magnetic disk units in recent years, the speed of movement of heads is increased higher and higher, and in consequence, the maximum frequency of the position signal Ex is increased and approaches the differentiation under limit frequency f1. This indicates that delay in phase of the differentiation signal Dx becomes larger after it has passed the differentiating circuit 13 and hence accurate velocity detection is hindered thereby. FIG. 6 is a chart showing the relation between the phase delay and the velocity detection. FIG. 6 illustrates, of the several waveforms shown in FIG. 4, part of the position signal Ex, sampling pulses Ps, rectification signal $D_F$ and velocity signal Ev when the head is moved at a predetermined fixed speed. Reference symbols $D_F'$ and Ev' individually indicate ideal waveforms when there is no delay in phase. Actually, due to the fact that phase delay becomes larger as the frequency of the signal approaches the differentiation upper limit frequency as seen in FIG. 5, the rectification signal $D_F$ will have no peak while the sampling pulses remain at a high potential. As a result, the velocity signal $D_F$ will be lowered below the ideal detection value in voltage and the waveform will be disordered. Thus, conventional velocity detectors has a defect that, when a head is moved at a high speed, the sensitivity in velocity detection drops and the quality of waveform deteriorates so that the velocity control in high accuracy is hindered thereby.

In the followings, another conventional system having a different servo track will be described. It is to be noted that the system construction of FIG. 2 as described above is also employed in this system.

FIG. 7 is an illustrative view showing an arrangement of servo tracks on a servo face and a waveform of a position signal after a signal obtained from these servo tracks has been processed. On the servo face, there aforecorded first servo tracks A, second servo tracks B, third servo tracks C and fourth servo tracks D in repetitive sequential adjacent relationship. The servo head 2 is movable in a direction transverse to these servo tracks. If the displacement of the servo head 2 in the direction transverse to the servo tracks is represented by x, the position signals obtained when the servo head 2 is moved in the direction x assumes waveforms as shown by Ex1 and Ex2; thus, two position signals will be obtained which are displaced a ¼ cycle in phase from each other. Reference symbol W indicates the width of a servo track, and the width of the core of the servo head is now about 2 W, different from the case of FIG. 2.

FIG. 8 is a block diagram of another conventional velocity detector similar to that of FIG. 3 and FIG. 9 is an illustrative view showing waveforms at several portions of the velocity detector as shown in FIG. 8. The velocity detector 8 receives the position signal Ex1 at an input terminal (a) thereof and the position signal Ex2 at another input terminal (b) thereof. FIG. 9 shows waveforms at several portions of the velocity detector from the initiation of movement from its stationary condition until the head is stopped again after seek of 16 tracks. Since the velocity of movement of the head is given as a time differentiated value of the head position, the velocity signal can be obtained by time differentiation of the position signals Ex1, Ex2. Based on this principle, the velocity detector 8 includes, at the first stage thereof, differentiating circuits 21 and 22 which differentiate the position signals Ex1 and Ex2, respectively. If perfect linearity is maintained between the head position and the corresponding position signals, then the differentiation signal can be considered the velocity signal, but actually, it is only when the absolute values of the position signals are within a limited range below a particular fixed value that linearity is maintained between the head position and the position signals. Accordingly, a range in which velocity can be detected by differentiation of a single position signal will also be discrete, and thus, in order to make up for this, two position signals which are displaced a ¼ cycle in phase from each other are used and velocity is really detected by processing of the waveforms as described in the followings. In the velocity detector 8 as shown in FIG. 8, the first position signal Ex1 is differentiated at the first differentiating circuit 21 which thus outputs a first differentiation signal Dx1 at an output point (c) thereof while the second position signal Ex2 is differentiated at the second differentiating circuit 22 which thus outputs a second differentiation signal Dx2 at an output point (d) thereof. Since the differentiation signals indicate the proper velocity around their peak points, if only these portions are sampled and interconnected, then it can be considered the velocity signal. The first differentiation signal Dx1 is inverted at a first inverter circuit 23 and outputted from an output point (e) of the same while the second differentiation signal Dx2 is inverted at a second inverter circuit 24 and is outputted from an output point (f) of the same. Connected to a signal selecting circuit 25 are the output point (c) of the first differentiating circuit, the output point (d) of the second differentiating circuit, the output point (e) of the first inverter circuit and the output point (f) of the second inverter circuit so that the two differentiation signals Dx1 and Dx2 and these respective inverted signals are inputted to the signal selecting circuit 25. The signal selecting circuit 25 selects only peak points of the four signals and interconnects them into a single detection signal $E_S$ which is outputted from an output point (g) thereof. In order to control selection of signals, there must be an external controlling input, and this is produced by checking voltage levels of the two position signals Ex1, Ex2 at a voltage comparator circuit 26 which serves as a sampling pulse generating means and is inputted as a control signal $P_C$ to the signal selecting circuit 25 via an input-/output point (h) thereof. The control signal $P_C$ is normally provided by a single digital signal or a plurality of digital signals, and a signal to be selected is determined depending upon a combination of these digital signals. In FIG. 9, the control signal $P_C$ is indicated not as an electric signal waveform but a symbol representative of a signal to be selected. Thus, when the condition of the control signal $P_C$ is c, then the differentiation signal Dx1 from the input point (c) is coupled to the output point (g). Also, when the condition is d, e or f, the corresponding signal is coupled in a similar manner so that the differentiation signals and the inverted differentiation signals are sequentially and selectively coupled to the output point (g). Accordingly, the output point (g) presents a detection signal $E_S$ which is produced by interconnection of these signals. Since this detection signal $E_S$ is formed by differentiation and interconnection of linear portions of the position signals Ex1 and Ex2 as described above, it can be considered a velocity signal. However, since the detection signal $E_S$ contains therein high-frequency noises, spikes upon switching of selection, and so on, an adding circuit 37 is employed in order to remove those from the detection signal $E_S$. The adding circuit 27 has a low pass characteristic so that it can remove such high-frequency noises and spikes as described above. However, this will deteriorate the velocity detection performance upon movement of a head at a high speed. In order to make up for this, a current signal $I_D$ (not shown) which is in proportion to a drive current of the motor is taken in via an input point (i) and is added to the detection signal $E_S$ to obtain a velocity signal $E_V$ at an output point (k).

In the velocity detector 8 as described in reference to FIG. 8, the performance of the entire system is significantly influenced by characteristics of the differentiating circuits 21 and 22. Conventional differentiating circuits commonly employ a combination of an operational amplifier with a resistor and a capacitor, and a transfer function $G_D$ is represented, similarly as in the preceding case, by a following equation:

$$G_D = \frac{sT0}{(1 + sT1)(1 + sT2)} \quad [T1 > T2]$$

where $s=j(2\pi f)$ (f: frequency, j: Imaginary unit).

FIG. 5 illustrates frequency characteristics of amplitude and phase of $G_D$. In FIG. 5, f1 shows a differentiation upper limited frequency, and f2 indicates an integration frequency. Normally, f1 is around several tens KHz, and a possible maximum frequency of the position signals Ex1, Ex2 when the head is moved is a fraction of this frequency. In a trend of increasing the speed of magnetic disk units in recent years, the speed of movement of heads is increased higher and higher, and in consequence, the maximum frequencies of the position signals Ex1, Ex2 are increased and approach the differentiation upper limit frequency f1. This indicates that delay in phase of the differentiation signals Dx1 Dx2 becomes larger after they have passed the differentiating circuits 21, 22 and hence accurate velocity detection is hindered thereby. FIG. 10 is a chart showing the relation between the phase delay and the velocity detection. In FIG. 10, reference symbols Dx1', Dx2' and $E_S$' individually indicate ideal waveforms when there is no delay in phase caused by the differentiating circuits 21, 22, and the detection signal $E_S$' thus presents a substantially fixed value. Actually, due to the fact that phase delay becomes larger as the frequency of the signals approaches the differentiation upper limit frequency as seen in FIG. 5, peaks of the differentiation signals Dx1, Dx2 will present a delay relative to the timing of the control signal $P_C$ so that the detection signal Ex will no more indicate the correct speed. Skewness of the waveform caused in this way can no more be corrected by the low pass characteristic of the adding circuit 27, and hence accurate velocity detection cannot be attained from the velocity signal $E_V$ (not shown in FIG. 10). Thus, any of such conventional velocity detectors as described hereinabove has a defect that, when a head is moved at a high speed, the sensitivity in velocity detection drops and the quality of waveform deteriorates so that the velocity control in high accuracy is hindered thereby.

SUMMARY OF THE INVENTION

Accordingly, the present invention has been made to overcome the defects as described hereinabove, and it is an object of the present invention to provide a velocity detector which presents a satisfactory velocity detecting performance even during movement of a head at a high speed.

Another object of the invention resides in provision of a magnetic head moving velocity detector of the type wherein velocity is detected by electrically processing a position signal of a magnetic head, characterized in that it comprises a differentiating circuit for differentiating the position signal, a full-wave rectifying circuit for rectifying an output of said differentiating circuit, a sample hold circuit for sampling and holding an output of said full-wave rectifying circuit, a phase-shifting circuit for delaying the position signal, and a timing pulse generating circuit for detecting the level of an output of said phase-shifting circuit to determine the timing for sampling, the phase delaying characteristic of the transfer function of said differentiating circuit being substantially coincided with the phase delaying characteristic of the transfer function of said phase-shifting circuit.

BRIEF DESCRIPTION OF THE DRAWINGS

FIG. 1 is a block diagram showing an example of a track servo system;

FIG. 2 is an illustrative view showing an arrangement of servo tracks and variations of a position signal;

FIG. 3 is a block diagram showing an example of a conventional velocity detector;

FIG. 4 is an illustrative view showing examples of waveforms at several portions of the velocity detector;

FIG. 7 is an illustrative view similar to FIG. 2, showing an arrangement of servo tracks and variations of position signals;

FIG. 9 is an illustrative view showing examples of waveforms at several portions of the velocity detector shown in FIG. 8;

FIG. 10 is an illustrative view showing influence of a delay in phase on the conventional velocity detector;

FIG. 12 is an illustrative view showing a frequency characteristic of a phase-shifting circuit according to the first embodiment of the invention;

FIG. 13 is an illustrative view showing a phase compensating effect of the first embodiment of the invention;

FIG. 14 is an illustrative view showing a frequency characteristic of a phase-shifting circuit according to a second embodiment of the invention;

FIG. 17 is a block diagram showing a fourth embodiment of the invention;

FIGS. 18(a) and 18(b) are diagrams showing phase-shifting circuits; and

FIG. 19 is a diagram showing a low pass filter.

DETAILED DESCRIPTION OF THE PREFERRED EMBODIMENTS

Figure 5:
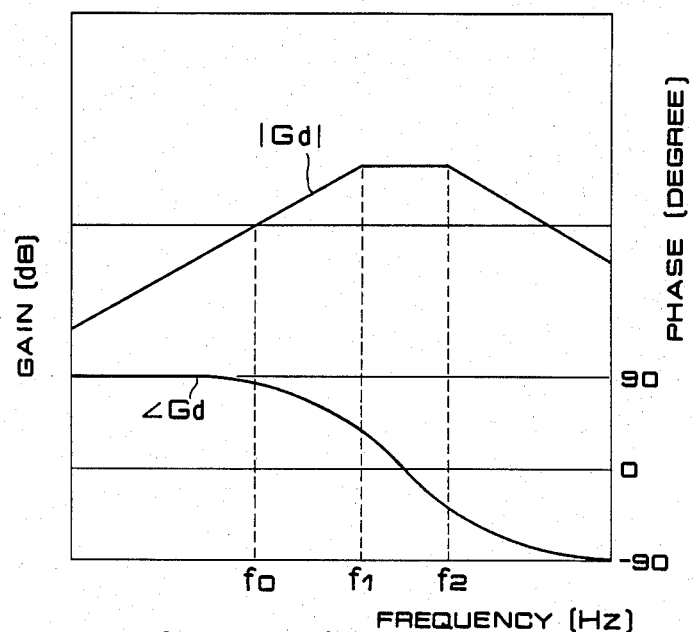
FIG. 5 is an illustrative view showing an example of a frequency characteristic of a differentiating circuit.
Figure 6:
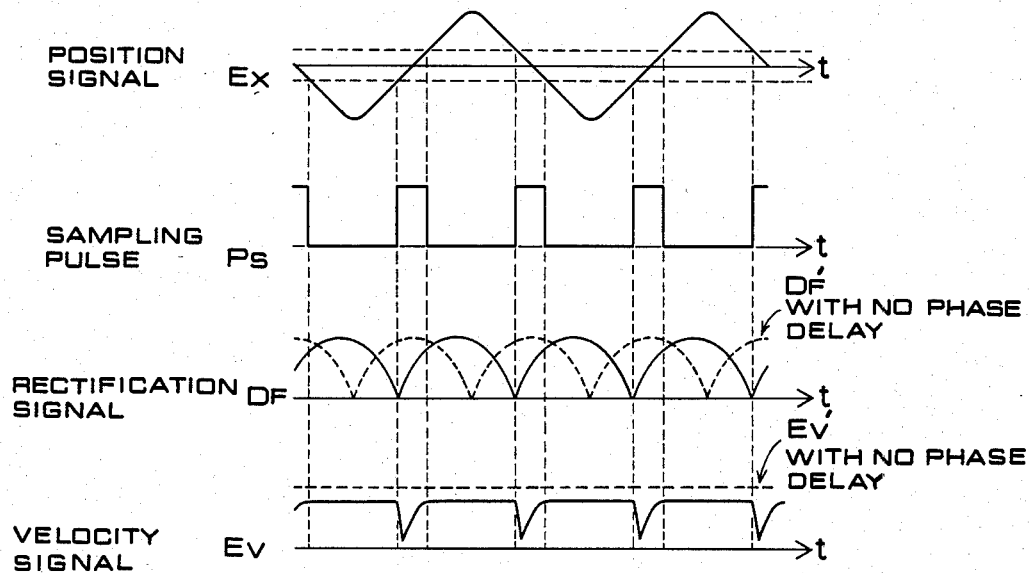
FIG. 6 is an illustrative view showing influence of a delay in phase on the conventional velocity detector.
Figure 11:
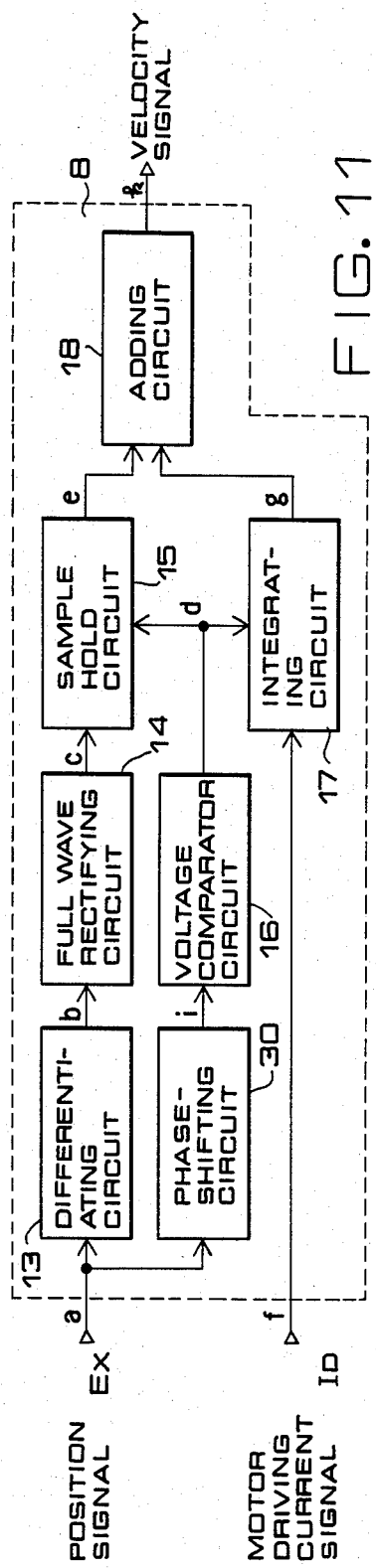
FIG. 11 is a block diagram showing a first embodiment of the present invention.

FIG. 11 is a block diagram showing the construction of a first embodiment of the present invention. A velocity detector 8 shown in FIG. 11 is different from the velocity circuit of FIG. 3 in that the former includes a phase-shifting circuit 30. The transfer characteristic of the phase-shifting circuit 30 as shown in FIG. 11 and serving as a delaying means is represented by a following equation:

$$G_p = \frac{1 - sT_p}{1 + sT_p}$$

where $T_P$ is a time constant of the phase-shifting circuit decided in accordance with the constant of the circuit. The transfer function as represented by this equation is illustratively shown in FIG. 12, and it can be seen that the amplitude is fixed over a whole frequency range while only the phase varies. Accordingly, if the phase-shifting circuit 30 and the differentiating circuit 13 are designed to have a substantially equivalent phase characteristic, then the differentiation signal Dx at the output point (b) of the differentiating circuit 13 will have a leading phase by +90 degrees relative to the delay signal $E_D$ at the output point (i) of the phase-shifting circuit 30 and thus a satisfactory differentiating characteristic can be provided thereby. FIG. 13 is an illustrative view showing operations of this embodiment. A phase delay $B_D$ of the delay signal $E_D$ relative to the position signal Ex can be obtained by an equation:

$$B_D = 2\tan^{-1}\frac{f}{f_p}$$

Accordingly, the delay time $\tau_D$ is given by $$\tau_D = \frac{1}{\pi f}\tan^{-1}\frac{f}{f_p}$$

In the meantime, the phase delay Bx of the differentiation signal Dx relative to the position signal Ex is provided by $$Bx = \tan^{-1}\frac{f}{f1} + \tan^{-1}\frac{f}{f2}$$

and thus the delay time $\tau_x$ at the differentiating circuit is provided by $$\tau_x = \frac{1}{2\pi f}\left(\tan^{-1}\frac{f}{f1} + \tan^{-1}\frac{f}{f2}\right)$$

In this embodiment of the invention, individual circuit constants are selected to meet the relation $f1 \approx f2 \approx f_p$. As apparent from the foregoing description, a relation $$\tau_D \approx \tau_x$$

is met. Accordingly, peak points of the rectification signal $D_F$ can be sampled with the sampling pulses produced from the delay signal $E_D$ as shown in FIG. 13, and thus the velocity signal $E_V$ finally obtained will become an ideal one.

The full range passing circuit which has a transfer characteristic represented by $G_P$ as described above can be replaced, for the phase-shifting circuit 30 shown in FIG. 11, by a low-pass filter which has a transfer function $G_L$ as represented by a following equation:

$$G_L = 1/(1+sT_P)^2$$

This transfer characteristic is diagrammatically shown in FIG. 14, and thus, a delay in phase $B_L$ becomes:

$$B_L = 2\tan^{-1}\frac{f}{f_p}$$

so that a same effect with the aforementioned full range passing circuit can be obtained.

As described hereinabove, in the velocity detectors according to the first and second embodiments of the present invention, a phase-shifting circuit is employed as a circuit for compensating a delay of a signal from a differentiating circuit, and the phase-shifting circuit and the differentiating circuit are designed to have a same delay characteristic so as to eliminate a time lag when sampling is effected. Thus, velocity can be accurately detected even when a head is moved at a high speed.

Figure 8:
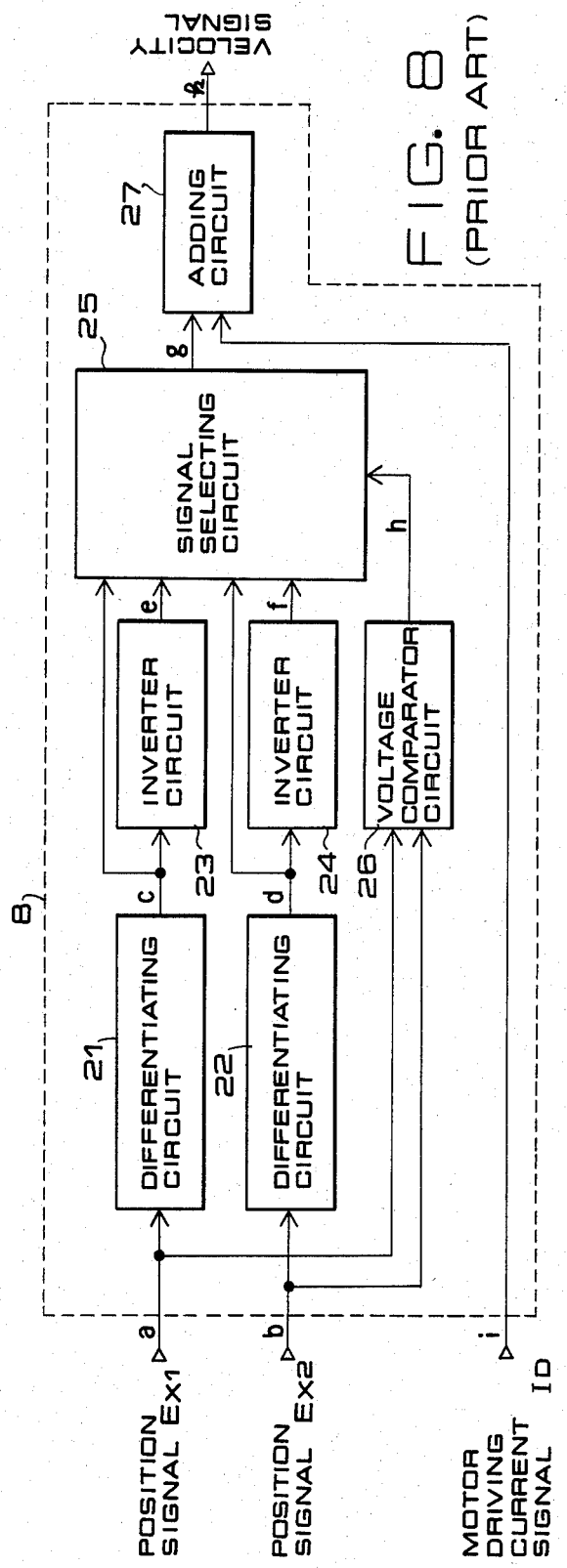
FIG. 8 is a block diagram showing an example of another conventional velocity detector.
Figure 15:
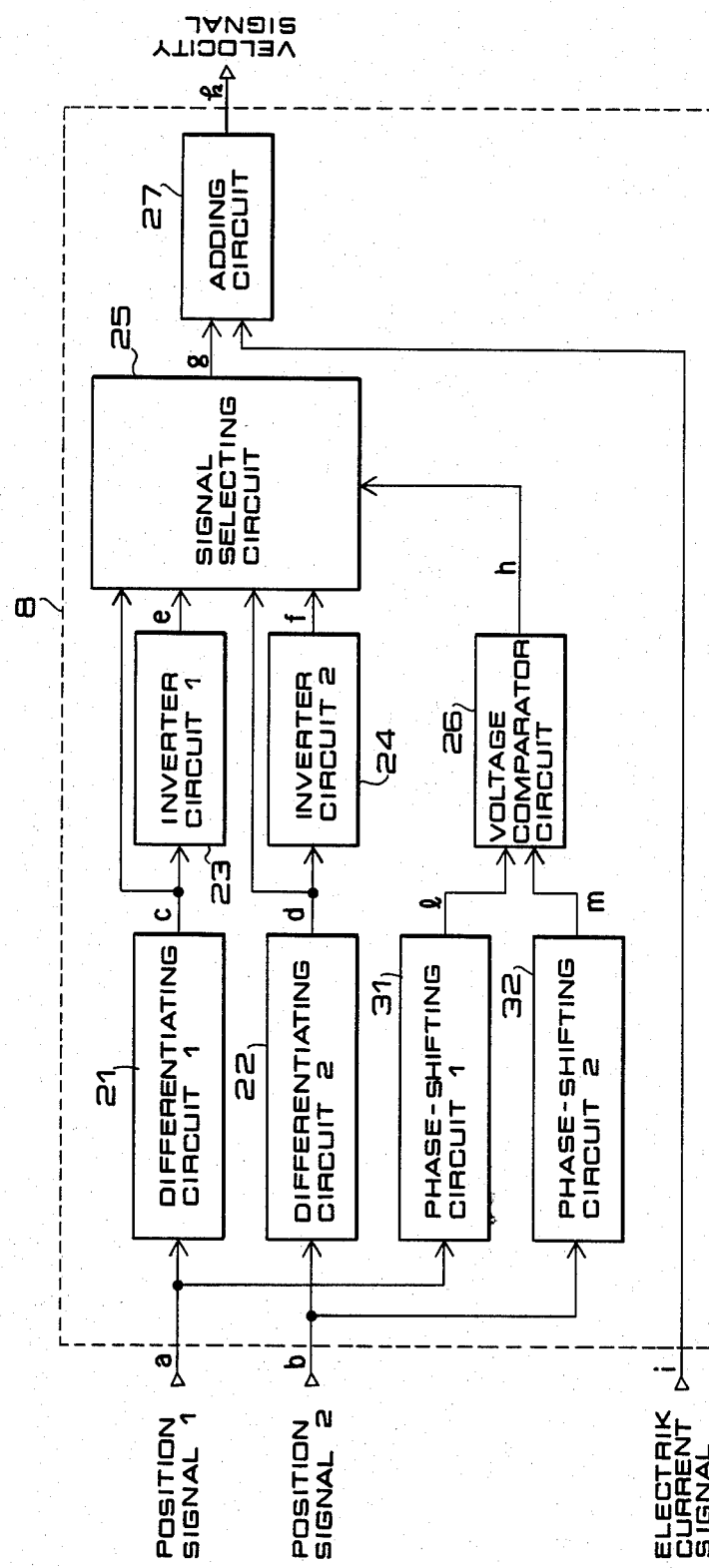
FIG. 15 is a block diagram showing a third embodiment of the invention.

Now, description will be given of the construction of a third embodiment of the invention with reference to FIG. 15. The velocity detector 8 shown in FIG. 15 is different from the velocity detector as shown in FIG. 8 in that it includes first and second phase-shifting circuits 31 and 32. The transfer characteristic of the phase-shifting circuits 31, 32 shown in this figure is represented by a following equation:

$$G_p = \frac{1 - sT_p}{1 + sT_p}$$

Figure 16:
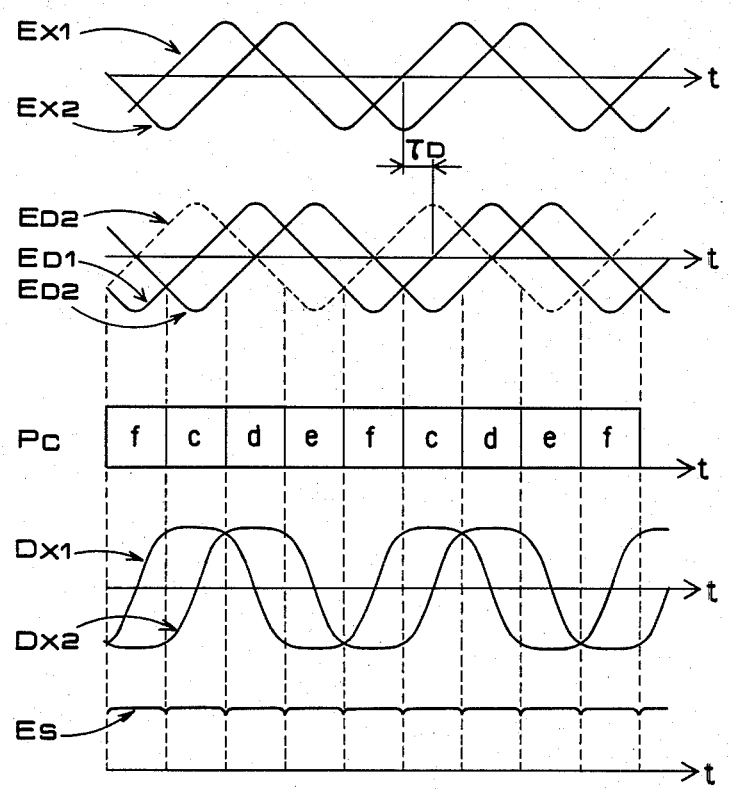
FIG. 16 is an illustrative view showing a phase compensating effect of the third embodiment of the invention.

The transfer function as represented by this equation is illustratively shown in FIG. 12, and it can be seen that the amplitude is fixed over a whole frequency range while only the phase varies. Accordingly, if the phase-shifting circuits 31, 32 and the differentiating circuits 21, 22 are designed to have a substantially equivalent phase characteristic, then the differentiation signals Dx1, Dx2 at the output points (c), (d) of the differentiating circuits 21, 22, respectively, will have a leading phase by +90 degrees relative to the delay signals $E_{D1}$, $E_{D2}$ at output points (l), (m) of the phase-shifting circuits 31, 32, respectively, and thus a satisfactory differentiating characteristic can be provided thereby. FIG. 16 is an illustrative view showing operations of this embodiment. A phase delay $B_D$ of the delay signals $E_{D1}$, $E_{D2}$ relative to the position signals Ex1, Ex2, respectively, can be obtained by an equation:

$$B_D = 2\tan^{-1}\frac{f}{f_p}$$

Accordingly, the delay time $\tau_D$ is given by $$\tau_D = \frac{1}{\pi f}\tan^{-1}\frac{f}{f_p}$$

In the meantime, the phase delay Bx of the differentiation signals Dx1, Dx2 relative to the position signals Ex1, Ex2, respectively, is provided by $$Bx = \tan^{-1}\frac{f}{f_1} + \tan^{-1}\frac{f}{f_2}$$

and thus the delay time $\tau_x$ at the differentiating circuit is provided by $$\tau_x = \frac{1}{2\pi f}\left(\tan^{-1}\frac{f}{f_1} + \tan^{-1}\frac{f}{f_2}\right)$$

In this embodiment of the invention, individual circuit constants are selected to meet the relation $f_1 \approx f_2 \approx f_p$. As apparent from the foregoing description, a relation $$\tau_D = \tau_x$$

is met. Accordingly, peak points of the differentiation signals Dx1, Dx2 and these inverted signals can be sampled with the control signals $P_C$ produced from the delay signals $E_{D1}$, $E_{D2}$ as shown in FIG. 16, and thus the velocity signal $E_V$ (not shown in FIG. 16) finally obtained will become ideal ones.

The full range passing circuits which have a transfer characteristic represented by $G_P$ as described above can be replaced, for the phase-shifting circuit 31 or 32 as shown in FIG. 11, each by a low-pass filter which has a transfer function $G_L$ as represented by a following equation:

$$G_L = 1/(1 + sT_p)2$$

This transfer function is as diagrammatically shown in FIG. 14 already mentioned, and thus, a delay in phase $B_L$ becomes:

$$B_L = 2\tan^{-1}\frac{f}{f_p}$$

so that a same effect with the aforementioned full range passing circuit can be obtained.

FIG. 17 is a block diagram showing the construction of a fourth embodiment of the invention. In this embodiment, the adding circuit 27 of the third embodiment as shown in FIG. 15 is replaced by a low-pass filter 33, thereby eliminating the correction by electric current signals. As has been already described, the role of current signals in the present invention is not involved in the basic principle of the velocity detector 8 but is a mere auxiliary one. Accordingly, depending upon a degree of quality of position signals Ex1, Ex2 coupled, only the low-pass filter 33 may satisfactorily remove high-frequency noises, and thus the present embodiment may provide a more simple and convenient velocity detector.

As apparent from the foregoing description, a velocity detector according to the present invention employs a phase-shifting circuit as a circuit for making up for a delay of a signal by a differentiation circuit with delay characteristics of both circuits being coincided with each other to thereby eliminate errors of timings during sampling. Accordingly, the velocity detector can accurately detect velocity even during movement of a head at a high speed.

Although the above description on the phase-shifting circuits 30, 31, 32 as well as the low pass filter 33 would be sufficiently understandable for those skilled in the art, a further description will be made with reference to FIGS. 18(a), 18(b) and 19.

Each of the phase-shifting circuit comprises a combination of an operational amplifier, resistors and capacitors. FIG. 18(a) shows a single gain phase-shifting circuit which has a constant gain over the entire frequency range, and FIG. 18(b) a phase-shifting circuit having a low pass characteristic. In both cases a predetermined phase characteristic can be obtained.

The low pass filter 33, as shown in FIG. 19, comprises a combination of an operational amplifier, resistors and a capacitor. Although the filter as shown has a primary attenuation characteristic, the circuit construction may, of course, be changed to have a desired attenuation characteristic when practically applied.

What is claimed is:

1. A magnetic head moving velocity detector of the type where velocity is detected by electrically processing a position signal of a magnetic head, characterized in that said detector comprises a differentiating circuit for differentiating the position signal, a full-wave rectifying circuit for rectifying an output of said differentiating circuit, a sample hold circuit for sampling and holding an output of said full-wave rectifying circuit, an integrating circuit for integrating an electric current signal, delaying means for delaying the position signal, a timing pulse generating circuit for detecting the level of an output of said delaying means to determine the timing for sampling, and an adding circuit for adding an output of said sample hold circuit and an output of said integrating circuit to each other, the phase delaying characteristic of the transfer characteristic of said differentiating circuit being substantially coincided with the phase delaying characteristic of the transfer characteristic of said delaying circuit.

2. A magnetic head moving velocity detector as claimed in claim 1, wherein said delaying means is a phase-shifting circuit which has a transfer characteristic $G_P$ provided by a following equation:

$$G_p = \frac{1 - sT_p}{1 + sT_p}$$

where $s=j(2\pi f)$, and f is a frequency, j the imaginary unit, and $T_P$ a time constant of said phase-shifting circuit.

3. A magnetic head moving velocity detector as claimed in claim 1, wherein said delaying means is constituted from a low-pass filter which has a transfer function $G_L$ provided by a following equation:

$$G_L = 1/(1+sT_P)^2$$

where $s=j(2\pi f)$, and f is a frequency, j the imaginary unit, and $T_P$ a time constant of said phase-shifting circuit.

4. A magnetic head moving velocity detector as claimed in claim 1, wherein said timing pulse generating circuit is constituted from a voltage comparator circuit.

5. A magnetic head moving velocity detector of the type wherein velocity is detected by electrically processing a position signal of a magnetic head, characterized in that said detector comprises a differentiating circuit for differentiating the position signal, a full-wave rectifying circuit for rectifying an output of said differentiating circuit, a sample hold circuit for sampling and holding an output of said full-wave rectifying circuit, delaying means for delaying the position signal, and a timing pulse generating circuit for detecting the level of an output of said delaying means to determine the timing for sampling, the phase delaying characteristic of the transfer characteristic of said differentiating circuit being substantially coincided with the phase delaying characteristic of the transfer characteristic of said delaying circuit.

6. A magnetic head moving velocity detector as claimed in claim 5, wherein said delaying means is a phase-shifting circuit which has a transfer characteristic $G_P$ provided by a following equation:

$$G_p = \frac{1 - sT_p}{1 + sT_p}$$

where $s=j(2\pi f)$, and f is a frequency, j the imaginary unit, and $T_P$ a time constant of said phase-shifting circuit.

7. A magnetic head moving velocity detector as claimed in claim 5, werein said delaying means is constituted from a low-pass filter which has a transfer function $G_L$ provided by a following equation:

$$G_L = 1/(1+sT_P)^2$$

where $s=j(2\pi f)$, and f is a frequency, j the imaginary unit, and $T_P$ a time constant of said phase-shifting circuit.

8. A magnetic head moving velocity detector as claimed in claim 5, wherein said timing pulse generating circuit is constituted from a voltage comparator circuit.

9. A magnetic head moving velocity detector of the type wherein velocity is detected by electrically processing two magnetic head position signals which are different in phase from each other, characterized in that said detector comprises a first differentiating circuit for differentiating a first position signal, a second differentiating circuit for differentiating a second position signal, a first inverter circuit for inverting an output of said first differentiating circuit, a second inverter circuit for inverting an output of said second differentiating circuit, first delaying means for delaying the first position signal, second delaying means for delaying the second position signal, a timing pulse generating circuit for detecting levels of outputs of said first and second delaying means to determine the timing for sampling, a signal selecting circuit for receiving output signals of said first and second differentiating circuits and output signals of said first and second inverter circuits to selectively output one of the received signals in response to a signal from said timing pulse generating circuit, and an adding circuit for adding an output of said signal selecting circuit and an electric current signal to each other, the phase delaying characteristics of the transfer characteristics of said first and second differentiating circuits and said first and second delaying means being substantially coincided with one another.

10. A magnetic head moving velocity detector as claimed in claim 9, wherein each of said first and second delaying means is a phase-shifting circuit which has a transfer characteristic $G_P$ provided by a following equation:

$$G_p = \frac{1 - sT_p}{1 + sT_p}$$

where $s=j(2\pi f)$, and f is a frequency, j the imaginary unit, and $T_P$ a time constant of said phase-shifting circuit.

11. A magnetic head moving velocity detector as claimed in claim 9, wherein each of said first and second delaying means is constituted from a low-pass filter which has a transfer function $G_L$ provided by a following equation:

$$G_L = 1/(1+sT_P)^2$$

where $s=j(2\pi f)$, and f is a frequency, j the imaginary unit, and $T_P$ a time constant of said phase-shifting circuit.

12. A magnetic head moving velocity detector as claimed in claim 9, wherein said timing pulse generating circuit is constituted from a voltage comparator circuit.

13. A magnetic head moving velocity detector of the type wherein velocity is detected by electrically processing two magnetic head position signals which are different in phase from each other, characterized in that said detector comprises a first differentiating circuit for differentiating a first position signal, a second differentiating circuit for differentiating a second position signal, a first inverter circuit for inverting an output of said first differentiating circuit, a second inverter circuit for inverting an output of said second differentiating circuit, first delaying means for delaying the first position signal, second delaying means for delaying the second position signal, a timing pulse generating circuit for detecting levels of outputs of said first and second delaying means to determine the timing for sampling, a signal selecting circuit for receiving output signals of said first and second differentiating circuits and output signals of said first and second inverter circuits to selectively output one of the received signals in response to a signal from said timing pulse generating circuit, and a low-pass filter for allowing only low frequency components of an output of said signal selecting circuit to pass therethrough, the phase delaying characteristics of the transfer characteristics of said first and second differentiating circuits and said first and second delaying means being substantially coincided with one another.

14. A magnetic head moving velocity detector as claimed in claim 13, wherein each of said first and second delaying means is a phase-shifting circuit which has a transfer characteristic $G_P$ provided by a following equation:

$$G_p = \frac{1 - sT_p}{1 + sT_p}$$

where $s=j(2\pi f)$, and f is a frequency, j the imaginary unit, and $T_P$ a time constant of said phase shifting circuit.

15. A magnetic head moving velocity detector as claimed in claim 13, wherein each of said first and second delaying means is constituted from a low-pass filter which has a transfer function $G_L$ provided by a following equation:

$$G_L = 1/(1+sT_P)^2$$

where $s=j(2\pi f)$, and f is a frequency, j the imaginary unit, and $T_P$ a time constant of said phase-shifting circuit.

16. A magnetic head moving velocity detector as claimed in claim 13, wherein said timing pulse generating circuit is constituted from a voltage comparator circuit.

* * * * *

UNITED STATES PATENT AND TRADEMARK OFFICE
CERTIFICATE OF CORRECTION

PATENT NO. : 4,510,537
DATED : April 9, 1985
INVENTOR(S) : Shigemasa Yoshida and Ichiro Araki It is certified that error appears in the above-identified patent and that said Letters Patent is hereby corrected as shown below:

Column 1, line 34, "followings" should read --following--.

Column 2, line 48, "followings" should read --following--.

Column 3, line 42, "Ts" should read --T2--.

Column 4, line 10, "followings" should read --following--.

Column 4, line 18, "aforecorded" should read --are recorded--.

Column 4, line 63, "followings" should read --following--.

Column 5, line 49, the numeral "37" should be --27--.

Column 9, line 66, "ideal ones" should read --an ideal one--.

Column 10, line 46, "circuit" should read --circuits--.

Signed and Sealed this

Fifteenth Day of October 1985

[SEAL]

Attest:

DONALD J. QUIGG

*Attesting Officer*

*Commissioner of Patents and Trademarks—Designate*